(12) United States Patent
Van Pottelbergh et al.

(10) Patent No.: US 9,194,120 B2
(45) Date of Patent: Nov. 24, 2015

(54) METHOD FOR RECYCLING SHEET MATERIAL COATED WITH A RELEASE AGENT AND USES OF THE THUS RECYCLED MATERIAL

(75) Inventors: Eric Van Pottelbergh, Geetbets (BE); Bart Verhasselt, Willebroek (BE)

(73) Assignee: RECULINER BVBA, Geetbets (BE)

( * ) Notice: Subject to any disclaimer, the term of this patent is extended or adjusted under 35 U.S.C. 154(b) by 421 days.

(21) Appl. No.: 13/582,071

(22) PCT Filed: Mar. 1, 2011

(86) PCT No.: PCT/EP2011/053028
§ 371 (c)(1),
(2), (4) Date: Oct. 2, 2012

(87) PCT Pub. No.: WO2011/107476
PCT Pub. Date: Sep. 9, 2011

(65) Prior Publication Data
US 2013/0216734 A1   Aug. 22, 2013

(30) Foreign Application Priority Data

Mar. 2, 2010 (EP) .................................... 10155219
Apr. 29, 2010 (EP) .................................... 10161522

(51) Int. Cl.
*B02C 19/00* (2006.01)
*E04B 1/74* (2006.01)
(Continued)

(52) U.S. Cl.
CPC .............. *E04B 1/74* (2013.01); *A01G 9/1086* (2013.01); *B02C 19/0056* (2013.01);
(Continued)

(58) Field of Classification Search
CPC .... B02C 18/148; B02C 18/14; B02C 13/286; B02C 19/0056; B02C 23/08; B22F 9/04; B03B 7/00; B03B 9/00; A01G 3/002; A01G 9/1086; E04B 1/74; E04B 1/80; E04B 1/7675; E04B 1/7604; E04B 2001/746; B29B 17/00; B29B 17/02; B29B 2017/0484; B29B 17/0412; D21B 1/08; B68G 1/00; B68G 2001/005; C08J 11/06; E02B 3/127; Y02W 30/622; Y02W 30/642; Y02W 30/701; Y02W 30/625; B29L 2031/744; B29L 2007/008; B29K 2711/123; B29K 2009/005
USPC .......................... 241/29, 24.19, 24.29, 22, 81
See application file for complete search history.

(56) References Cited

U.S. PATENT DOCUMENTS 2,428,100 A * 9/1947 Soulen ............................. 241/34
4,084,753 A * 4/1978 Fruh ................................ 241/34
(Continued)

OTHER PUBLICATIONS

English Translation of Merges et al. (DE1097802B), Dec. 19, 1961.*

*Primary Examiner* — Faye Francis
*Assistant Examiner* — Onekki Jolly
(74) *Attorney, Agent, or Firm* — Harness, Dickey & Pierce, P.L.C.

(57) ABSTRACT

The present invention concerns a method for treating waste material comprising: —Collecting release coated cellulose or polymeric sheets from producers and end-users thereof in the form of dense, bulky masses, such as rolls and stacks; —Pre-shredding the dense, bulky masses of release coated sheets into smaller, less dense masses in preparation to the following process steps; —Preparing the pre-shredded material by mixing, separating foreign bodies like metals, etc., and feeding it to a primary grinding station (3); —Grinding the materials into small pieces, of the desired size, preferably down to less than 1 mm; —Adding additives selected from flame retardant, hydrophobic material, pesticide and mixtures thereof and mixing them with the recycled material; —Optionally forming a batt or a sheet by a wet process and/or by adding a binder.

11 Claims, 4 Drawing Sheets

(51) Int. Cl.
- *A01G 9/10* (2006.01)
- *B29B 17/02* (2006.01)
- *B68G 1/00* (2006.01)
- *C08J 11/06* (2006.01)
- *D21B 1/08* (2006.01)
- *E02B 3/12* (2006.01)
- *E04B 1/76* (2006.01)
- *E04B 1/80* (2006.01)
- *B02C 23/08* (2006.01)
- *B29B 17/00* (2006.01)
- *B29B 17/04* (2006.01)
- *B29K 711/12* (2006.01)
- *B29L 7/00* (2006.01)
- *B29L 9/00* (2006.01)
- *B29L 31/00* (2006.01)

(52) U.S. Cl.
CPC ............... B02C 23/08 (2013.01); B29B 17/00 (2013.01); B29B 17/02 (2013.01); B68G 1/00 (2013.01); C08J 11/06 (2013.01); D21B 1/08 (2013.01); E02B 3/127 (2013.01); E04B 1/7604 (2013.01); E04B 1/7675 (2013.01); E04B 1/80 (2013.01); *B29B 17/0412* (2013.01); *B29B 2017/0484* (2013.01); *B29K 2711/123* (2013.01); *B29L 2007/008* (2013.01); *B29L 2009/005* (2013.01); *B29L 2031/744* (2013.01); *B68G 2001/005* (2013.01); *E04B 2001/746* (2013.01); *Y02W 30/622* (2015.05); *Y02W 30/625* (2015.05); *Y02W 30/642* (2015.05); *Y02W 30/701* (2015.05)

(56) References Cited

U.S. PATENT DOCUMENTS

| | | | | |
|---|---|---|---|---|
| 4,133,490 A | * | 1/1979 | Jackson | 241/101.6 |
| 4,191,224 A | * | 3/1980 | Bontrager et al. | 141/100 |
| 4,454,992 A | * | 6/1984 | Draganov | 241/42 |

* cited by examiner

METHOD FOR RECYCLING SHEET MATERIAL COATED WITH A RELEASE AGENT AND USES OF THE THUS RECYCLED MATERIAL

CROSS-REFERENCE TO RELATED APPLICATIONS

This application is a 371 U.S. National Stage of International Application No. PCT/EP2011/053028, filed on Mar. 1, 2011, which claims priority to European Patent Application Nos. 10155219.8, filed on Mar. 2, 2010, and Ser. No. 10/161, 522.7, filed on Apr. 29, 2010. The contents of the above applications are incorporated herein by reference in their entirety

TECHNICAL FIELD

The present invention relates to a method for mechanically treating waste material consisting of cellulose or polymeric sheet material coated with a release agent, such as used as liner for self-adhesive labels and films. In particular, the treated waste material can be transformed into insulation material or as recycled paper, the latter requiring the prior separation of the release agent from the sheet material.

BACKGROUND FOR THE INVENTION

Self adhesive labels, films, and tapes have become very popular for their versatility and ease of use, since no extra glue is required to make them adhere to a substrate. They are used extensively in offices and by school children of course, but also large volumes are used by industries for labelling their products. The self-adhesive labels are provided attached to a release liner made of paper or a polymeric carrier and usually coated at least on one side with a release agent, most often consisting of a silicone release layer, which provides a release effect against the adhesive of the label. Other release agents are sometimes used, such as wax, paraffin, low surface energy fluorinated compounds, etc. Examples of silicone coated liners are given in U.S. Pat. No. 5,275,855, JP07279099, and U.S. Pat. No. 6,036,234. Silicone or other release agent coated liners are also used more generally as backing in the production of films, such as PVC films. The total global consumption of release liners in 2008 is believed to be around 32 Billion square meter of coated product, which is equal to 75% of the surface area of Switzerland. Approximately 85% of this material is paper based and 15% is plastic based (cf. http://en.wikipedia.org/wiki/Release_liner).

After use of the labels, films or tapes supported on said carriers, the liners are pure waste and must be disposed of. Considering the volumes mentioned above, this results in a great source of waste, which is coming under the scrutiny of several governments which intend to tax the disposal thereof as packaging material. The issue is rendered even more sensitive for cellulose release liners because the cellulose carriers are usually made of virgin material which has never gone through any recycling cycle yet. Recycling paper coated with a release agent by conventional repulping methods for making printing or packaging paper is possible but difficult without loss in quality because of insufficient disintegration of the fibres and sticking of resin particles on the rolls and felts due to the release coating. Solutions to recycle silicone coated paper were proposed in U.S. Pat. No. 5,567,272 and EP587000, requiring the use of salts of phosphoric esters of fluorinated alkanols to chemically separate the silicone release agent from the cellulose sheet carrier, the latter being forwarded to a recycled paper manufacturing line. Alternatively, DE4302678 and U.S. Pat. No. 5,573,636 propose a specific release coating comprising a solid material, preferably in the form of microcapsules, which swell in contact with water and promote separation of the coating from the pulp in an aqueous medium, for repulping the cellulose fibres.

The building and transportation industries are making more and more use of cellulosic materials coming from old newspaper, cardboard, etc. to manufacture heat and acoustic insulating materials in the form of loose fibrous materials, fibrous mats with or without skins, panels of varying stiffness, and even hollow blocks; the manufacture of blocks and panels may require the use of a binder, a glue or a cement. Cellulose insulating material has a much lower "embodied energy" than e.g., glasswool or rockwool insulation, wherein the embodied energy is the sum of the energy to transport the raw material to the manufacturing facility+the energy for manufacturing the product+the energy to deliver the manufactured product. General information concerning cellulose insulating materials can be found e.g., in: http://www.ownerbuilderonline.com/blown-cellulose-insulation.html, http://www.cellulose.org/CIMA/GreenestOftheGreen.php; http://www.youtube.com/watch?v=bwcblg6g5Cs&feature=related.

DE19653243 discloses a heat and acoustic insulating material made of cellulose fibres from old paper and impregnated with e.g. boric acid or salts thereof as flame retardant and against formation of mould, wherein the cellulose fibres come at least partly from wet glue applied paper labels.

DE4334200 discloses a process for producing thermally insulating materials from waste paper by means of a mild hydromechanical treatment with subsequent drying using hot air. The boards or mats formed therefrom have a very low specific density, from which a high thermal insulation value results.

WO2002090682 discloses sound insulation partitions comprising at least a substantially homogeneous self-supporting rectangular cellulose mat having a density ranging between 200 and 800 kg/m$^3$, said mat essentially consisting of fibres derived from the treatment of practically lignin-free recycled papers or paperboards, the bond between the fibres within the mat being obtained at least partly during the production of the mat by wet process.

DE4402244 discloses a sound and heat insulating material made from a dried, aqueous suspension containing 10-50 wt % chopped waste paper and 90-10 wt % animal and/or plant fibres such as hairs, short wool fibres, etc. The mixed suspension is placed on a sheet former, in particular on a sieve, where the water is removed. A flat flexible mat is formed and subsequently dried and finished.

DE19835090 discloses a method of production of cellulose insulation materials including the control of various parameters in the mill to obtain a homogeneous material comprising additives.

DE3641464 discloses an insulating board made of a mixture of old newspapers free fom any surface treatment or fillers, natural fibres, and a glue and/or reaction promoter. EP0617177 discloses a skin/core building element for heat insulation and vibration damping wherein the core is made of a filler of paper like material and thin thermoplastic component to act as binder upon melting.

DE4403588 discloses heat insulation components constructed in the form of hollow blocks and prefabricated wall boards, produced, in particular, from pulped, water-resistant old paper, such as old labels, stickers, high-gloss paper, advertising posters and billboards (signs), mixed with water, cement and sand. In particular, a preferred mixture ranges from 50 vol % to 80 vol % of water-resistant old paper, from 10 vol % to 20 vol % of cement, and from 10 vol % to 60 vol % of sand.

US2009/0173464 discloses an acoustic panel comprising from 10-40 wt % cellulosic fibres, 0-30 wt % gypsum, 0-15 wt % starch and other components. Similarly, DE10336569 discloses a fire-resistant gypsum fibreboard made from a mixture of 87-78% gypsum and 13-22% cellulose fibres made from used paper as a reinforcing component and a 35-50% boric acid based on the fibre weight for raising the flame resistance.

In the transportation industry, DE20200550114581 discloses a cellulose based insulation material for the exhaust system of a combustion engine and US2002025421 discloses a sound absorbing insulation material containing cellulose for the cabin of a motor vehicle. DE4331567 discloses a light weight fire protection element for the aircraft industry made of waste paper mixed with a special binder, resulting in an "apparently paradoxical fireproof material made of paper".

There remains in the art a need for finding routes to recycle release coated carriers of the type used as liners for labels. In parallel, there remains a lot to do in the fields of recycled paper and of insulation materials for the building, transportation, and other industries to provide an insulation material which is cheap, and has good thermal and acoustic insulation and damping properties. The present invention proposes a solution to these and other problems in the art of recycling.

SUMMARY OF THE INVENTION

The present invention concerns method for treating waste material in the form of release coated cellulose or polymeric sheets comprising the following steps:
 (a) Collecting release coated cellulose or polymeric sheet material from producers and end-users thereof,
 (b) Preparing the collected material by mixing, separating foreign bodies like metals, etc., and feeding it to a dry-grinding station;
 (c) In one or several dry-grinding stations dry-shredding and dry-grinding the materials into small pieces, preferably into stripes of an average length comprised between 5 and 30 mm, more preferably, between 7 and 20 mm, most preferably between 10 and 15 mm and optionally comminuting the small pieces into smaller particles having an average size smaller than 4 mm, preferably smaller than 2 mm; more preferably smaller than 1 mm; and
 (d) Optionally adding additives selected from flame retardant, hydrophobic material, pesticide and mixtures thereof and mixing them with the recycled material;

The main difference of the present invention with previous attempts to recycle release coated sheet material, is that while the latter worked at modifying the material to render it suitable for a conventional repulping method in an aqueous medium, with all the problems associated with the presence of even small amounts of release coating material in suspension, the present invention applies to the material as such a dry recycling route instead.

The efficacy of the method of the present invention is further enhanced if the release coated cellulose or polymeric sheet material is collected from producers and end-users thereof in the form of dense, bulky masses, such as rolls and stacks, which are pre-shredded into smaller, less dense masses in preparation to step (b). Great advantages in the fields of insulation materials and filling for upholstery which will be discussed more in detail below can be reached if said collected material already comprises a flame retardant, such as boric acid or any salt thereof. The flame retardant would be added to the sheet carrier by the sheet manufacturer, thus anticipating and promoting the recycling of the produced material.

The present method is highly advantageous as it is possible for certain release agent coated sheets to mechanically separate, during the primary and/or secondary dry-grinding operations, a substantial fraction of the release coating from the sheet carrier, in the absence of any chemical treatment. The two fractions may then be separated in a separating station, separating the incoming stream into a first, carrier rich fraction and a second, release agent rich fraction. The separating station may comprise one or more of a cyclone, a filter, and an ultrasonic or an electrostatic separation means. This embodiment is very advantageous as it permits the use of the carrier rich fraction to be further processed to produce either insulation materials, e.g., in the form of insulation batts or sheets; or to incorporate a conventional repulping process in an aqueous medium for producing recycled paper. Note that insulation materials need not necessarily be formed from a carrier rich fraction, and is advantageously obtained directly from the comminuted release coated cellulose or polymeric sheet material, possibly blended with e.g., comminuted waste paper such as newspaper, to yield insulation materials of different grades, qualities, and prices. Alternatively, the cellulose and/or the release agent rich fractions may further be treated to become suitable for use as a filler or a binding agent in concrete, cementitious mixtures and coatings.

At any stage of the method, the collected or treated material may be blended with cellulose or polymeric sheet waste material from other origins, or with a release agent, for example from the release agent rich fraction obtainable from the separation discussed supra. Alternatively, the second, release agent rich fraction separated from the carrier material can be blended with ground cellulose or polymeric sheet waste material from other origins in order to control the content in release agent of the final material.

In case of a carrier comprising essentially cellulose which can be separated from the release coating by dry-grinding as discussed above, the cellulose rich fraction thus obtained may be further processed in a wet shaping station to form sheets of paper.

Some applications, such as in the building industry or upholstery, require the use of a flame retardant. In case the collected material does not comprise a sufficient amount of flame retardant for one such application, a flame retardant, preferably boric acid or any salt thereof may be added to, and mixed with the recycled material before, during or after the grinding steps (c).

A preferred source of release coated cellulose or polymeric sheet material is liners for holding self-adhesive labels or films. They can conveniently be collected at the liner manufacturers, the self-adhesive label base material manufacturers, the label printers, the producers of goods on which are applied self-adhesive labels, and so on, all of them generating large volumes of such liners. The release agent is generally one of silicone, wax, paraffin, or fluorinated material.

Recycled material obtained from the method discussed above can be used in various application. First, the thermal and acoustic insulating properties thereof can advantageously be used for insulating thermally and/or acoustically any of:
 a wall, a ceiling, or a panel in the field of buildings,
 a panel in the field of transportation,
 a sound dampening wall along roads, railways, stadiums or any noisy outdoor environment;
 a quilted piece of garment or blanket, or for filling
 a mattress, or upholstery,
 a package in the field of packaging and storage and transportation of goods.

Alternatively the recycled release coated cellulose material may be used for the production of recycled paper in a conventional wet process, provided a sufficient fraction of the release agent was removed during the dry-grinding process. Similarly, thermoplastic carriers, if sufficiently separated from their release coating, may be used in any thermoplastic recycling process well known in the art.

Another field of applications of release coated cellulose sheet material is casing soil or growing medium used for growing some vegetables and mushrooms, or as additive to earth to enhance the water balance and water flow in said soil or earth. Preliminary results have shown that the treated material offered an optimal water buffering effect for the growth, e.g., of mushrooms. Furthermore, the material seems to act as a heat capacitor, absorbing heat, which it gradually releases in time. This property may also partly explain the excellent growth of mushrooms observed with the present material. This property makes the material suitable for other applications such as hot pillows, or hot compresses to be applied onto the skin. Similarly, if a packaged good must be maintained at a high temperature, such as food, the heat capacitive properties of the material can be used to this effect, by e.g., lining the walls of the packaging with the present material, preferably sandwiched between two walls of the packaging.

Hydromulching/hydroseeding is another application wherein the present material shows excellent potential. Hydromulching is applying a slurry of water, wood fibre mulch, and often a tackifier, to prevent soil erosion. Hydroseeding, often used as synonym of hydromulching, is a method for planting seeds, e.g., in the field of grass planting, comprising the steps of mixing mulch, seed, fertilizer, and water in the tank of a hydromulching machine. The mixed material is then pumped from the tank and sprayed onto the ground. The material is often referred to as a slurry, much like a soupy batch of green papier-mâché. Once applied to the soil, the material enhances initial growth by providing a microenvironment beneficial to seed germination. The use of traditional recycled paper cellulose fibre material in hydromulching/hydroseeding applications is known. The use of recycled release coated cellulose sheet material treated according to the present invention instead of traditional recycled paper cellulose fibre seems advantageous in that the present material has a significantly lower tendency to create a dry crust as well as clogging together. Without wishing to be bound by any theory, it is believed that the release coating material present in the material contributes to this effect.

The present invention also concerns an insulation material comprising dry-shredded recycled material, flame retardant, and optionally other components, obtainable by a method as discussed supra. In particular, it is preferred that the paper or thermoplastic sheet material is a liner for adhesive labels, tapes, or films, and is preferably coated with silicone as release agent and the carrier is as follows:
(a) the cellulose sheet material is paper, preferably glassine paper or kraft paper, or, alternatively,
(b) the polymeric sheet material is a thermoplastic film, preferably selected from PE, PP, or PET.

The insulation material of the present invention is preferably in a form suitable for blowing it dry into a cavity, as loose fill onto a surface, or wet against a surface. Alternatively, it can be in the form of a batt or a sheet.

BRIEF DESCRIPTION OF THE FIGURES

For a fuller understanding of the nature of the present invention, reference is made to the following detailed description taken in conjunction with the accompanying drawings in which:

FIG. 1: shows a transversal cut of a release coated carrier, typically used as liner for adhesive labels and the like.

DETAILED DESCRIPTION OF THE INVENTION

Figure 1:
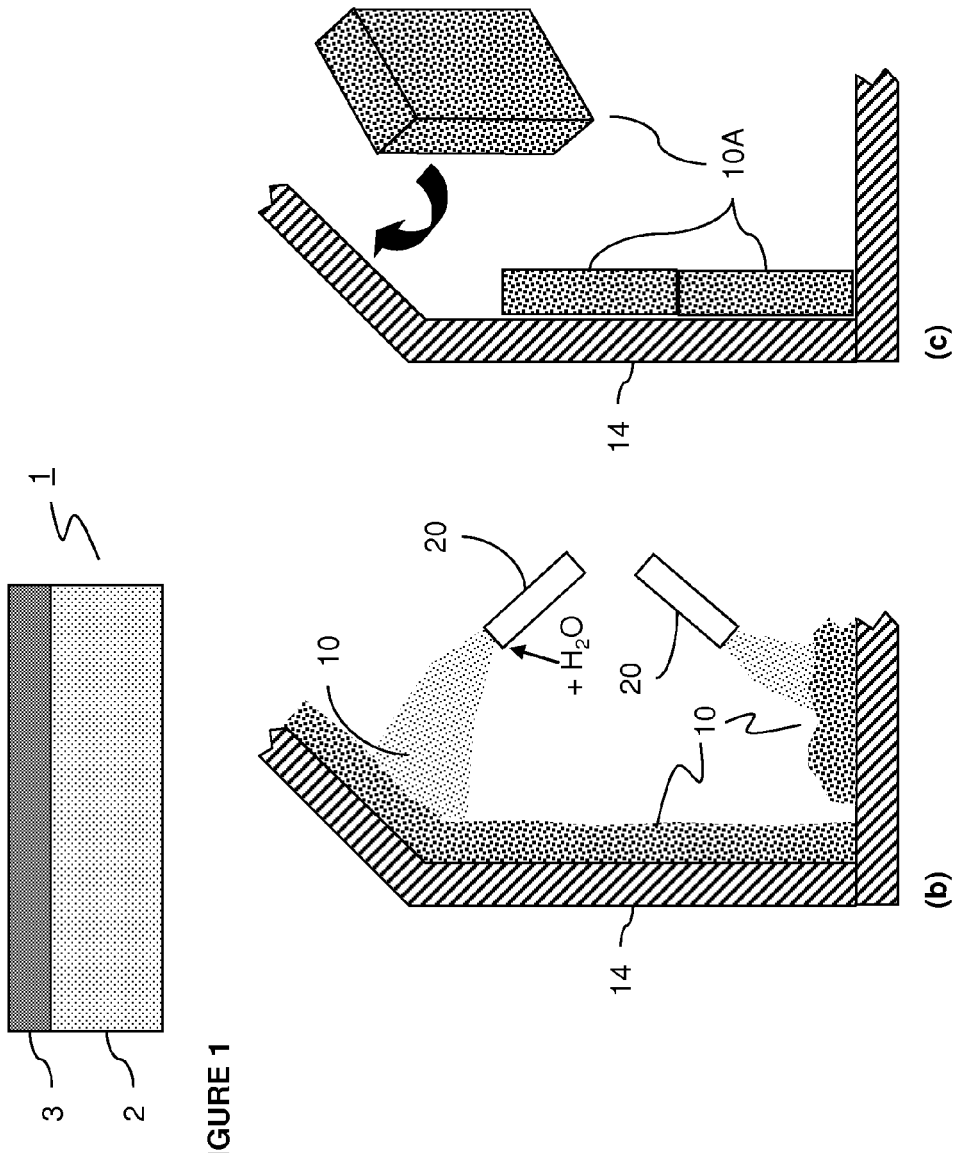

The present invention offers a new and advantageous solution to the difficult problem of recycling release coated sheet carriers (1), in particular silicone coated carriers which are widely used e.g., as liners for self adhesive labels, tapes, films and the like. As illustrated in FIG. 1, such liners comprise a carrier (2) which is often a cellulose material, such as glassine paper or kraft paper, or alternatively, the carrier (2) can be a thermoplastic film, made of a polyolefin like PE or PP, or of a polyester such as PET, PEN, etc. In the present context, the term "sheet" is used to designate "a wide expanse or thin piece of something" (The Chambers Dictionary (2000)), which can be continuous or in discreet pieces of regular or irregular geometry, presented in any form such as rolled, stacked, or even crumpled. The carrier (2) is coated on one or two sides with a release agent (3), which provides a release effect against any type of sticky material such as the adhesive on a label. The release agents (3) most widely used on liners for adhesive labels, tapes, films, and the like, are crosslinkable silicones, but other release agents such as silicone, wax, paraffin, polyurethane, fluorinated or acrylic based material may also be found. Depending on the type of release agent and the intended use of the coated sheet material, the release agent is generally applied in an amount of the order 0.2 to 10.0 g/m$^2$, which is enough to degrade the quality of paper recycled with such cellulose based liners by traditional wet paper repulping processes, because the disintegration of the fibres is insufficient and the resin particles tend to stick on the rolls and felts. This is a major inconvenience because unlike newspapers and the like, paper used for liners is generally produced from virgin material, which has never gone through any recycling cycle and has therefore a high ecological value. As reviewed above, solutions exist to overcome this drawback associated with conventional wet repulping processes, but they require additional treatment steps and chemicals. The problem is even more acute when the carrier is a thermoplastic film since the generally crosslinked release coating cannot be easily separated from the carrier and may not be melted and reprocessed therewith.

The present invention provides a particularly advantageous alternative method for recycling both cellulose and thermoplastic based release coated carriers (1) such as liners. In the present invention, the release coated carrier may be processed to form a novel and advantageous insulating material (10) suitable for the sound and thermal insulation of buildings and of sound barriers along the roads and the like, as well as of means of transportation such as automotive vehicles, trains, airplanes, and the like. It can also be used to fill quilted garments and blankets, or upholstery. Other applications are possible, such as growing medium for mushrooms, vegetables, plants, etc., or as heat capacitor in heated pillows or compresses to be applied on the skin. In some applications, it can be advantageous to form pellets of the ground material in a post treatment step (26c). It is also possible to take advantage of the high water absorbency of the treated material in applications such as filling of diapers, sanitary napkins, and the like, or as a substitute to sand material in floodbags. The advantage for this last application would be weight reduction of the filled bags when transported. Once fully moist, they can perform the same function as traditional sand filled floodbags.

In some cases of cellulose sheets coated with a release agent, it is possible to mechanically separate a sufficient amount of release agent from the cellulose carrier during a mechanical grinding step (23), (24). In this case, a cellulose rich fraction may be separated from a release agent rich fraction. Each fraction can be treated separately in conventional recycling processes, or combined with other sources of materials for further processing.

The waste material can be collected from the producers and end users of for example adhesive labels, etc. like offices and administrations, but it is preferably collected from industries generating large amounts of waste liners. In particular, the waste material can be collected from liner manufacturers, self-adhesive labels manufacturers, label printers, producers of goods on which are applied self-adhesive labels, and the like. These represent a particularly advantageous source of "clean" waste release coated carriers, available in large quantities. Liner manufacturers will of course generate some waste, be it for insufficient quality of a particular product batch or at start or end of a roll. The manufacturers of self-adhesive label base material combine large rolls of release coated material with corresponding rolls of label base material to form a 4-layer laminate comprising the carrier, the release coating, the adhesive, and the label support. The thus produced laminate is then slit to the desired width of the labels, thus generating large amounts of waste. The same applies with label printers, if different from the former, as they may be in charge of the final cutting of the labels. Finally, the producers of goods on which are applied self-adhesive labels will generate as much liner waste as self-adhesive labels are applied on their goods. The amount of waste liner material thus generated can be huge and these industries are usually equipped with automated collecting means for collecting the waste liners, as described e.g., in WO2005110902. In most cases, the huge amounts of waste liners thus collected are in the form of dense, bulky masses, usually rolls or stacks.

Figure 2A:
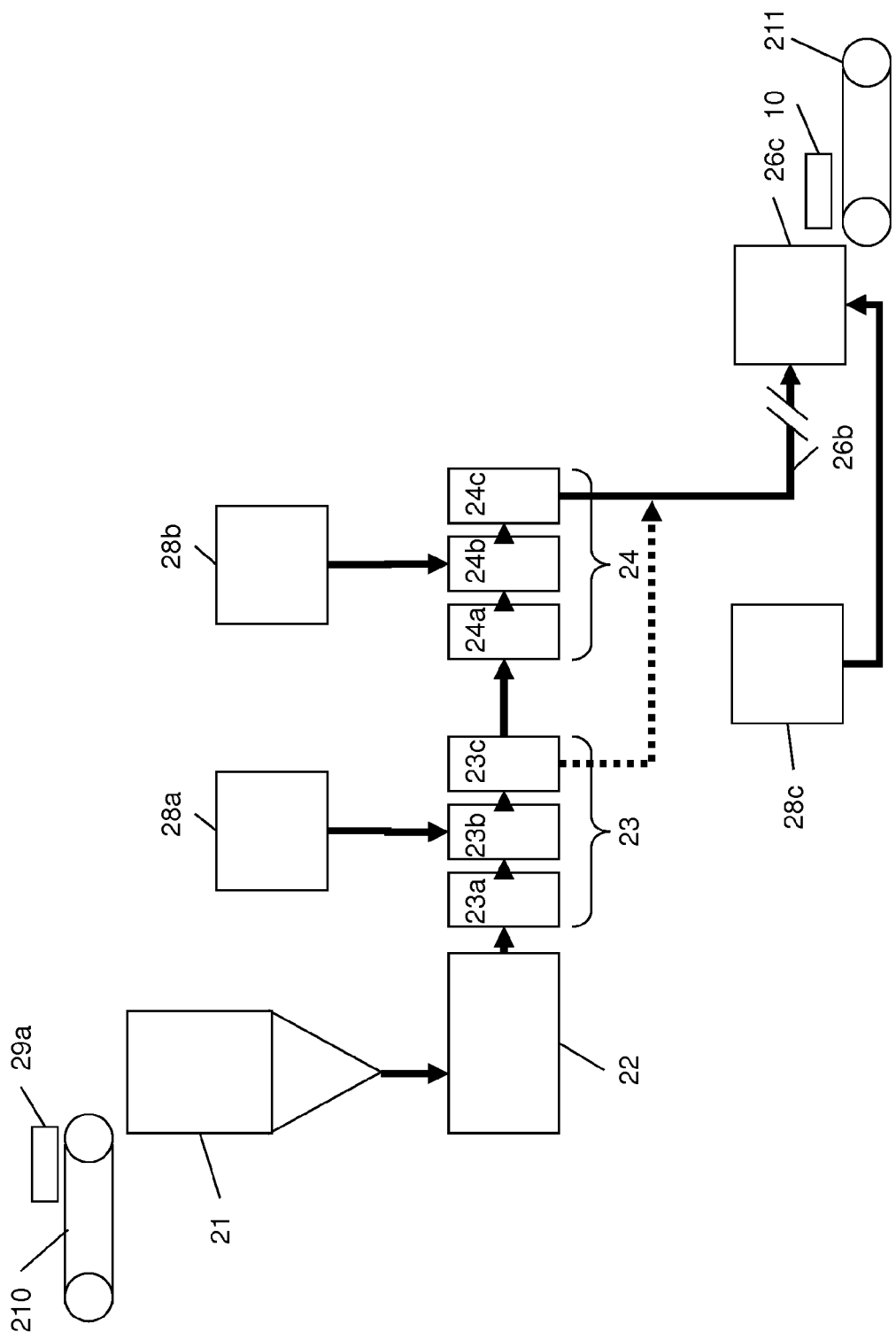
FIG. 2A: shows a schematic representation of a first embodiment of the method of the present invention.
Figure 2B:
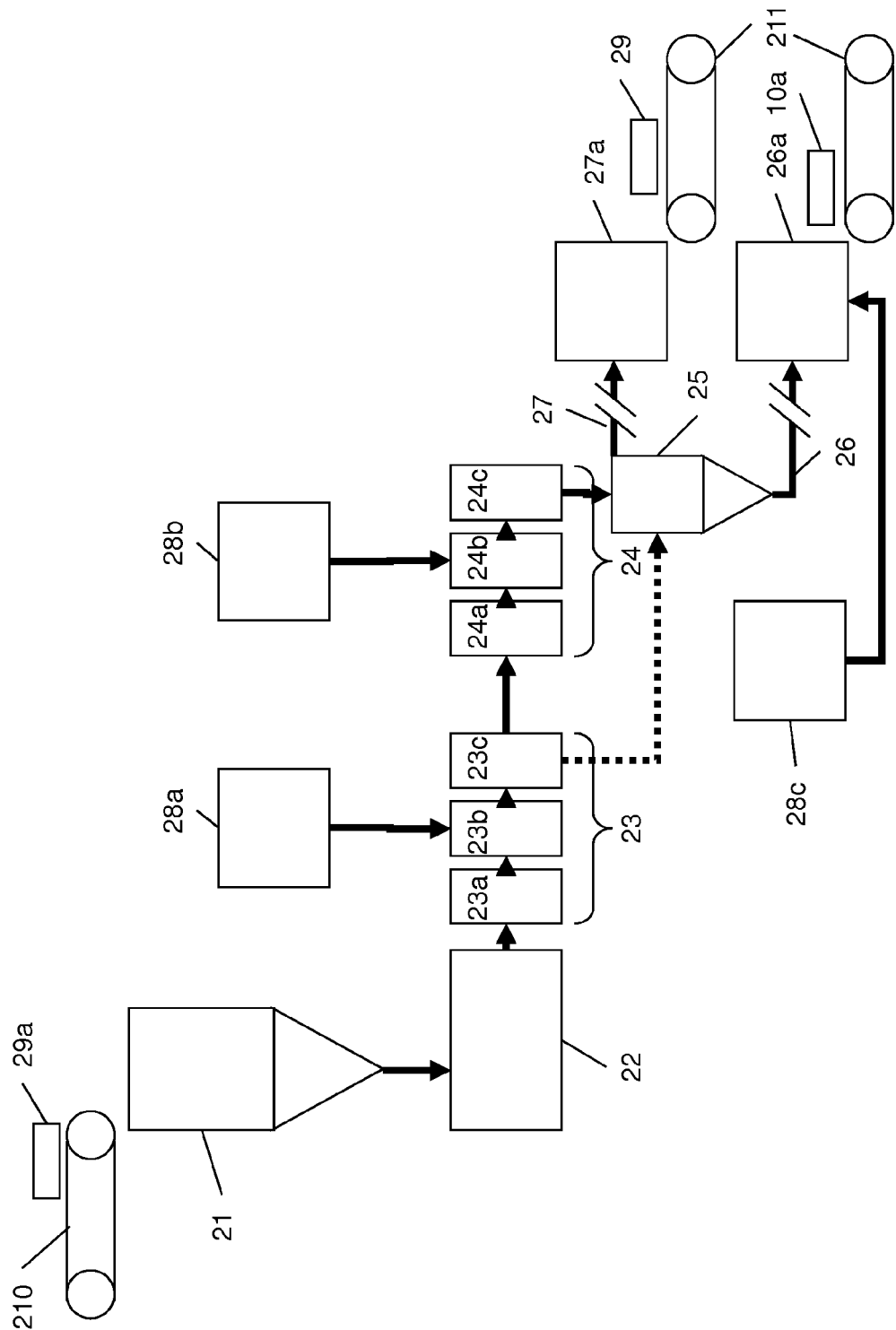
FIG. 2B: shows a schematic representation of a second embodiment of the method of the present invention.

As illustrated in FIGS. 2(a) and 2(b), the collected release coated sheet waste material may be conveyed with supplying means (210), such as a conveying belt, to a supply station (21). If the collected material is in the form of dense, bulky masses (29a), such as rolls or stacks of liners, which cannot be ground as such in conventional dry-grinding lines, the material is first supplied from supply station (21) to a pre-shredding station (22), breaking the dense masses of sheet material into looser chunks and lumps of smaller sizes suitable for being ground in dry conventional grinding stations. Pre-shredding stations suitable for the purpose of the present invention can be found, as illustrative purpose and in no way being restricted thereto, in the catalogue of the company SSI Shredding Systems (cf. e.g., www.ssiworld.com/watch/industrial_paper.htm and www.ssiworld.com/watch/printers-waste.htm). At this stage, the thus pre-shredded chunks of waste material are comparable in size and texture with more traditional sources of household waste sheet material comprising newspapers, magazines, packaging, etc., and may from here on be blended with other such sources of waste material. The release coated waste material, blended or not with other sources of waste material, can be prepared for primary grinding by mixing it and removing all foreign bodies such as metal clips, staples, plastic sheets in case of cellulose waste material, and the like.

At this stage, the material can be dry-shredded and dry-ground into particulate material in a dry-grinding station (23), (24). It is often preferred to use several grinders, which can be grouped as a primary, coarser grinder (23) and a secondary, finer grinder (24). In the primary grinder (23), which may itself be composed of a cascade of several grinders (23a), (23b), (23c), the thus prepared waste material is dry-shredded into small pieces, preferably into stripes of an average length comprised between 5 and 30 mm, more preferably, between 7 and 20 mm, most preferably between 10 and 15 mm. For some applications, this size is sufficiently small and the material needs no further comminution steps. The primary grinding station (23) may be connected to an additive supply means (28a) to add additives such as flame retardants, hydrophobic materials, pest repellents, and the like. The material may also be blended with other sources of waste material in the primary grinding station (23). The stripes thus obtained may also undergo a crimping process to yield an insulating material with higher specific volume. For many applications, however, it is necessary to further reduce the size of the particles to lower than 10 mm.

In these cases, the stripes of waste material may be transferred to a secondary grinding station (24). Like the primary grinding station (23) the secondary dry-grinding station (24) may be composed of a cascade of several grinders (24a), (24b), (24c). In the secondary grinding station (24), the size of the stripes is further reduced to an average particle size smaller than 4 mm, preferably smaller than 2 mm; more preferably smaller than 1 mm. Here again, the secondary grinding station (24) may be connected to an additive supply means (28b) to add additives. Suitable primary and secondary grinding stations may be found, for example, in WO2005/028111 and in www.scribd.com/full/27498804?access_key=key-2ed7qzqp8la1u1hgo86i.

The expressions "dry-grinding", "dry-shredding", and derivatives thereof do not exclude spraying of a limited amount of liquid onto the material, such as flame retardant, and other additives, but it does exclude the formation of a suspension of the treated material in a liquid as in conventional paper repulping processes. At all time during the shredding and processing the treated material is in a solid form.

As illustrated in FIG. 2(a), from the end of the primary grinding station (23c) or, if it applies, of the secondary grinding station (24c), the particulate material 26(b) is transferred to a treating station (26c) for e.g., shaping the material into sheets, panels, batts, etc. and/or for packaging. The treating station (26c) may be connected to an additive supply means (28c) to supply e.g., water, an organic or mineral binder (e.g., cement), flame retardant, a dye, or the like. Treating station (26c) may comprise any means for shaping the recycled particles in any desired form, such as a press to form e.g., panels, means for dewatering the slurry to form sheets, in case water was added after dry-grinding the material, curing means, such as convection, induction or IR-ovens, UV-station, etc, in case a binder is used, and the like. The recycled material (10) can then be removed with conveying means (211) and is ready for commercialisation as insulating material as dry particulate, sheets, panels, batts, and the like, as is discussed below. Alternatively, the comminuted material may be advantageously used as filler in concrete, cementitious mixtures and other building materials.

Another possible application for the thus recycled material (10) is in hydromulching or hydroseeding applications, with enhanced results compared with similar applications with conventional paper, in particular, with respect to dry crust formation and clogging observed with conventional paper.

The comminuted release coated material can also be used as casing soil in replacement of, or complement to peat casing soil used for growing some vegetables and mushrooms. A study has been carried out with general waste paper with some encouraging, though not concluding results (cf. Sassine et al., J. App. Sci. Res., 1, (3): 277 (2005)). Some preliminary tests suggest that some of the problems mentioned in Sassine's paper could be solved with the material (10) produced from the present method thanks to the presence of the release agent, which yields a proper degree of hydrophobicity without affecting the moisture buffering effect of cellulose. For such end-applications, the treating station (26c) could include composting means and the additive supply means (28c) may include a source of nitrogen and possibly a source of a hydrophobic material. Composting and nitrogenation are preferably carried out off-line from the grinding line, as illustrated by the broken line (26b). It can also be taken profit of the advantageous behaviour of the materials produced with the method of the present invention by using it as additive to earth, to enhance the water balance and water flow in said earth and soil.

The treated material shows a relatively high heat capacity, storing energy that it releases gradually to ambient. This property could partly explain the excellent results obtained with mushrooms. The compost layer is the layer containing fermented manure, straw and some different additives, and acts as feeding stock for the growth of the mushrooms. This compost layer is covered by casing soil onto which the mushrooms start growing. The current problem with this system is the initial rising of the temperature of the compost in the first days of the process. This leads to too fast and uncontrolled mycelium growth. The traditional way of solving this problem is to cool down the whole atmosphere in the room. Besides costing a lot of energy, the negative effect of the cooling is a slowing down of the entire growth cycle by several days. In the recent years, techniques have been developed to only cool down the compost layer and not the entire atmosphere of the room anymore. This necessitates cooling tubes to be integrated in the mushroom beds which is a costly exercise investment wise. The relatively high specific heat of the present material allows to reduce the temperature increase of the compost in the first days, thus replacing the use of a cooling system. The thermal energy accumulated by the present material during the first days of growth is released to the system in the following days thus enhancing growth of the mushrooms. Additional benefit of the cellulose fibres added to the compost would be the increase of water content so that the nutrients become more easily available for the mushroom growth.

The property of the present material to act as a heat capacitance, absorbing thermal energy that it releases gradually in time can advantageously be used in heated pillows and compresses to be applied on the skin, or to not only passively insulate a piece of good contained in a package, but actually actively heating it.

In some cases it is possible that a substantial fraction of the release coating is mechanically released from the carrier during the primary or secondary grinding stages (23), (24). This may happen in particular during the dry-grinding stage, which generates intense shear stresses that may provoke cohesive failure in the carrier material, close and parallel to the interface between carrier and release coating. This phenomenon is observed in particular with cellulose carrier material of rather low density, wherein the hydrogen bonds between not so closely packed cellulose fibres are weaker than the interfacial bond between the release agent and the cellulose carrier. Cohesive failure is less likely to happen with thermoplastic carriers, but some separation of the release coating was observed nonetheless with some particular materials combinations, in particular when low surface energy thermoplastic carriers were used, such as polyolefins. In this case, however, the failure was more interfacial. Regardless of the nature of the failure, if a substantial fraction of the release agent may be separated from the carrier material, it may be interesting, as illustrated in FIG. 2(b), to profit of this debonding to actually separate the material stream in two fractions: a carrier rich fraction (26) and a release agent rich fraction (27) in a separating station (25). The separating station may comprise any known means for separating two bodies having differing physical and chemical properties, such as, for example, a cyclone, a floatation station, a filter, and ultrasonic or electrostatic separation means, and any combinations thereof.

The release agent rich fraction (27) may further be processed in a treating station (27a) to be suitable for use as a filler or a binding agent in concrete, cementitious mixtures and coatings. Alternatively, the release agent rich fraction (27) may be added to a stream of cellulose insulation material based on waste paper other than release coated, such as newspapers, magazines, packaging material, and the like, to enhance the properties thereof.

The carrier rich fraction (26) may further be processed in a treating station (26a) to produce, as discussed above in respect of station (26c) in FIG. 2(a), an insulating material of more accurately controlled composition or, alternatively, to produce recycled paper by methods well known in the art in case of cellulose carriers. The recycled product (10a) can then be removed with conveying means (211). The further treatment of both fractions in treating stations (26a), (27a), in particular if it concerns producing recycled paper with the cellulose rich fraction, needs not necessarily be carried out continuously in the same production apparatus but, as illustrated by the broken lines (26), (27), it may be carried out in another plant.

Figure 3:
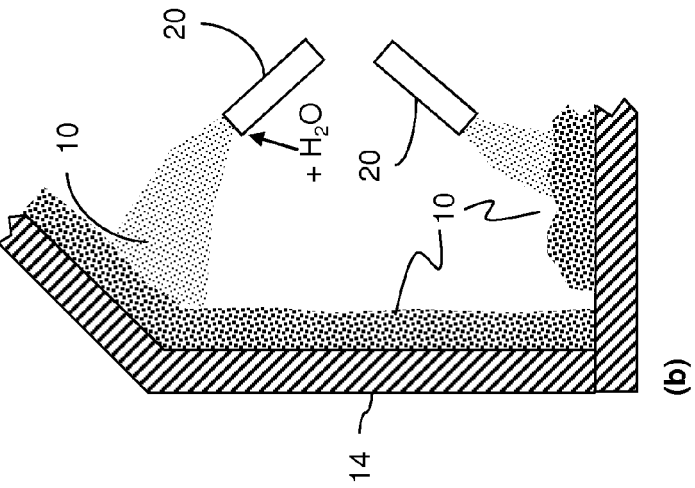
FIG. 3: shows three embodiments for the application of an insulating material in a building or means of transportation.
Figure 3:
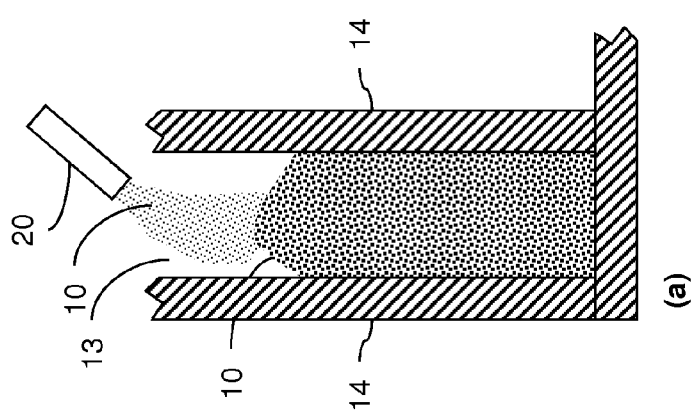

As illustrated schematically in FIG. 3, the treated material can be used as insulating material (10) to be applied in different forms and different ways to a surface; As shown in FIG. 3(a) the insulating material (10) may be blown in a dry form with a gun (20) into a cavity (13) formed by two panels or walls or any retainer (14). In old houses, the material can be sprayed through a hole drilled on top of the outer panel of a wall. The insulation material (10) must be sprayed until it reaches the appropriate density. With this form of application settling is observed and may reach as much as 20% with state of the art cellulose insulation materials. It is usually observed that a lower degree of settling occurs with higher initial densities. The level of settling is very much reduced with the insulation material of the present invention since the silicone acts somewhat like a loose binder that stabilizes the structure. After settling of the material, the front panel may be withdrawn if desired as, depending on the degree of compaction thereof, the material will remain in place. The application of the insulating material (10) by dry blowing has the advantages of minimizing air gaps especially around inserts or intricate regions. It is, however, recommended to call an experienced installer for dry spraying the insulation material as the control of the density, settling, and pressure applied on the panels must all be controlled carefully.

The insulating material (10) in a particulate form may also be sprayed in place with a gun (20) against a wall (14) or even a horizontal ceiling by mixing it with a fluid like water. Upon drying the material will remain in place thanks to the hydrogen bonds between cellulose hydroxyl groups created by the fluid such as water. In some cases, in particular—albeit not exclusively—when the carrier (2) is a thermoplastic material, the use of a binder may be necessary in this type of applications. This technique of wet spraying is schematically illustrated in FIG. 3(b) and it has the advantage over dry spraying of requiring no cavity (13) to fill, of generating substantially less dust upon application, and of settling much less. Air gaps are minimized with this technique, thus enhancing the insulation properties of the material. Here again, calling an experienced installer is highly recommended.

As an alternative to supplying the insulation material (10) in a particulate form for spraying, it can be supplied as preforms (10A) such as batts, sheets, mats, tiles, or even bricks. Here again, the use of a binder may be necessary, but not mandatory, as with cellulose materials sufficient integrity of the preforms may be obtained through a wet process. If a binder is used, it can be organic, like a glue or a resin, or mineral like cement, gypsum, etc. Fillers like sand, talc, etc. may be used too. Alternatively, the preforms (10A) may have a sandwich structure with two skins holding a central core made of the insulating material (10). In some instances, a single skin may be sufficient. The role of the skins is not restricted to mechanical integrity of the preforms (10A), but may advantageously act as a barrier against moisture, gas, radiations, etc. and can therefore be useful when a binder is used too.

As illustrated in FIG. 3(c), such preforms can then simply be applied and fixed to a wall by means well known in the art. This solution has the advantage of being very simple and of requiring no particular expertise for its implementation, and it also generates virtually no dust in situ. On the other hand, air gaps are more difficult to avoid then with spraying techniques.

FIG. 3 illustrates embodiments of applications in the insulation of a building. The insulation material of the present invention can be used in other fields such as the transportation industry, e.g., in applications as disclosed e.g., in DE20200550114581 and US2002025421 for the automotive industry and in DE4331567 for the aircraft industry. It can also be used on sound dampening wall along roads. Other applications can be found in the textile industry, as fill for quilted garments and blankets or even for upholstery and mattresses.

When cellulose insulation material has a lower "embodied energy" than e.g., glass fibres or rockwool insulation materials, the insulation material of the present invention has an even lower embodied energy than most traditional cellulose insulation materials for the following reasons. Traditional cellulose material is generally made of recycled paper of various origins, including newspapers, printed matter, wrapping papers, etc., which may need an additional treatment to eliminate inks and volatile components before being reprocessed into insulation material. This additional treatment usually involves a thermal treatment with chemicals, which is not necessary with waste liners collected from industrial end users, as the material is homogeneous and devoid of any printed matter. Another advantage of the insulation material of the present invention is that packaging volume can be reduced with respect to most traditional cellulose insulation materials on the market. Particulate cellulose insulation material is generally supplied in 10-15 kg packages with a degree of compaction which is limited by the ability of the compacted material to fluff up to the desired density upon dry spraying thereof. Generally, the degree of compaction of the packaged materiel is about double of the desired density of the insulation material in place when applied dry, i.e., with one package of volume $V_1$, a cavity of volume of the order of $2 \times V_1$ can be filled. It has been found that insulation material according to the present invention could be dry sprayed to a desired density even when the material was packaged with a degree of compaction of three or four (i.e., down to a volume of the order of $\frac{1}{2} V_1$). Without being bound by any theory, it is believed that this is explained by the fact that cellulose liners being produced from virgin material, the cellulose fibres are longer and stiffer than the ones of recycled newspapers and the like. Hence the particulate material obtained by grinding used liners has a higher spring force than most traditional cellulose insulation materials which allows it to recover a high degree of fluffiness after compaction to at least 400% in a package. The higher degree of compaction is, of course, highly advantageous for storage and distribution of the products. These two advantages: no thermal and chemical deinking stage required and higher degree of compaction of the packaged material lowers substantially the embodied energy of the insulation material of the present invention in both the energy required to manufacture the material and in the energy to deliver it.

Beside providing a cheap and easy recycling option for the problematic release coated sheet carriers, the insulation material obtained with the method of the present invention is advantageous over other similar materials of the prior art, even without separation of the release coating from the carrier, because the presence of the generally crosslinked release agent such as silicone gives the particulate material a cohesion which cannot be found in the prior art materials without the addition of a separate binder. This cohesion is advantageous in dry spray applications (cf. FIG. 3(a)) because it reduces substantially the amount of dust upon spraying, and it especially reduces substantially the level of settling of the material, yielding an insulation layer stable in time and homogeneous throughout the height of the insulated wall. In wet spraying applications (cf. FIG. 3(b)), a higher mechanical integrity of the sprayed layer is reached thanks to the release agent. For the manufacture of preforms (10A) such as batts, sheets, etc. (cf. FIG. 3(c)), less to no binder is needed to yield self supporting preforms. In all cases, the presence of silicone particles dispersed within the bulk of the insulating material confers a degree of water repellence, which contributes to preserving the material from moisture. Furthermore, traditional insulation materials are made of recycled paper, of different origins (landfills) and of unknown nature (newspaper, packaging, etc.). For this reason and in spite of any thermal treatments discussed above, such insulation materials may still contain an undesired amount of VOC (volatile organic compounds) which contribute to indoor air pollution; and may be responsible for the development of allergies (cf. e.g., http://www.healthyhouseinstitute.com/a_688-Cellulose_Insulation). With the present invention, it is possible to obtain an insulation material which, apart from the flame retardants, is virtually free of any VOC. In particular, since large volumes of release coated sheet material can be recovered directly from companies, a control on the quality of the waste material to be recycled never afforded to date is possible, thus allowing to provide a "premium version" of VOC-free insulation material. In some cases it also provides a very efficient solution to the production of recycled paper from waste release coated sheet material.

In applications requiring the use of a flame retardant, as in the fields of building, transportation, and filled furniture, the addition of a flame retardant, such as boric acid may be required. This step increases substantially the overall cost of production and use of such materials for the following reasons. An additional flame retardant dosing station with metering means must be provided in the material treatment apparatus, prior to packing and shipping the material. This additional investment can easily be absorbed by a high capacity production line, producing centrally material to be distributed over a rather large area for use by the operators. The finer the material is comminuted, however, the higher the packaging volume, with direct consequences on the cost of transportation. For this reason, it would seem more cost effective to shred the collected material in a central production line, into stripes down to an average length comprised between 5 and 30 mm, pack them compactly and ship them to the end-users or to local distributors, where the stripes can be comminuted down to their final size. Small scale grinding apparatuses for comminuting a limited volume of fine stripes are unexpensive and easy to transport in situ. This, however, becomes impossible in case a flame retardant must be added. It is clear that it could be added centrally onto the shredded fine stripes, but the amount of flame retardant required to treat stripes is higher than with smaller size particles because the surface of material exposed to the flame retardant is lower.

Figure 4:
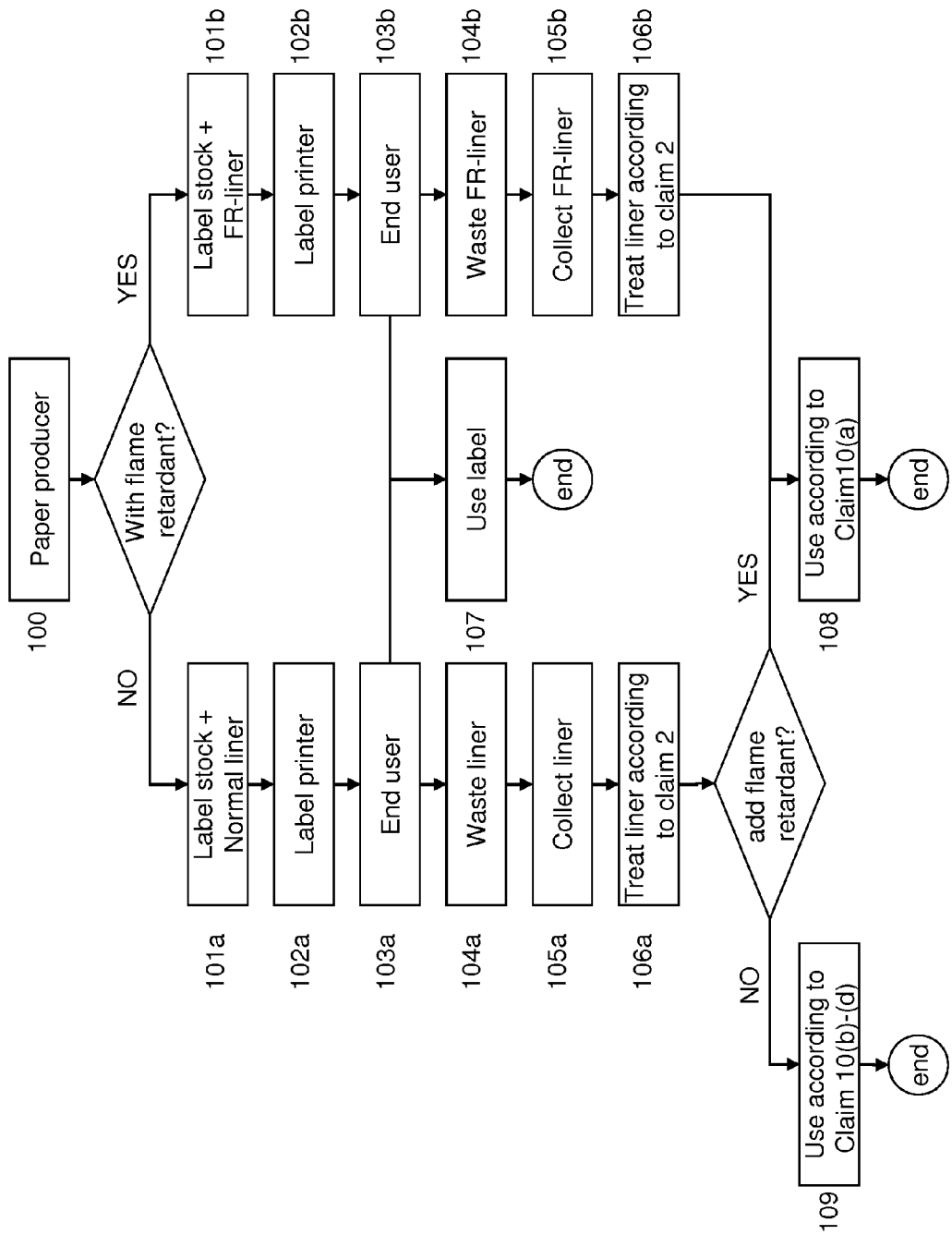
FIG. 4: is a flowchart illustrating the complete life cycle of a release coated sheet material form production, use thereof as liner, to recycling thereof, in case (a) of no flame retardant in the original sheet carrier, and (b) of an original sheet carrier comprising flame retardant.

For this reason it was proposed that the liner producers (100) treat their liners with flame retardant to yield flame retarded liners (FR-liners (101b) (cf. FIG. 4). The amount of flame retardant for treating a given amount of liner material is less if applied directly to the pulp by the liner producer, upstream of the life cycle of the material, than if added at any stage after collection of the liner waste material. Furthermore, since the flame retardant is more homogeneously distributed at the level of the cellulose fibres, it is likely that higher fire resistance classes can be reached by the paper producer with the same amount of flame retardant. These FR-liners would be sold at a higher cost to the printer (102b) who would sell their labels applied on flame treated liners to the end users (103b) to an overall higher cost, comprising the non refundable price of a label applied on a non flame treated liner+a refundable, recycling deposit for recycling the liner. After use of the labels (107) the waste FR-liners are collected as described above, and the recycling deposit is refunded to the end user, by the recycling operator, who can save money in flame retardant, and transportation. The material needs only be dry-ground to the desired particle size prior to being used as insulating material in the building, transportation, furniture, or apparel industries (108) without the need of adding any additional flame retardant.

Even if the recycling deposit amounted exactly to the costs saved by the absence of a flame treatment step during the recycling process, this operation would be beneficial to environment, because less flame retardant would be needed, less lorries would be needed to transport the same weight of material, but with a reduced volume, and it would guarantee that the quasi totality of the liners would be recycled. This approach is unique in the involvement of the liner manufacturer, totally upstream of the life cycle of the produced liners, anticipating the second life of the liner as insulating material or filler in a piece of furniture or apparel. It also offers a new approach to the spraying method of insulating material in that fine comminuting and spraying could be operated in situ by the same operator, with a small transportable grinder coupled to a spraying gun, thus reducing substantially the cost of the material.

For not flame treated liners (101a), the same steps (102a-106a) as illustrated in FIG. 5 would apply as with flame treated liners, apart from the costs being reduced by the amount of the recycling deposit. At the recycling processing stage, a flame retardant may be added for applications (108) requiring its presence, or not for applications (109) requiring no flame retardant, such as in vegetal growth applications.

An insulating material according to the present invention is particularly advantageous because, on the one hand, it offers a solution for recycling huge volumes of release coated sheet material such as liners, which is otherwise very difficult to recycle and, on the other hand, because the properties of this material, in particular volumetric stability in time, are superior to most existing comparable products in the market, obtained from other sources of sheet materials.

The insulating material (10) of the present invention comprises shredded and ground particles of recycled release coated sheet material admixed with additives to control the resistance to flame, moisture, and pests, such as insects, bugs, rodents, etc. as discussed supra. For example, boric acid or any salt thereof is the most commonly used flame retardant and is particularly advantageous, since not only does it provide the required resistance to flame but it also provides moisture, mould, and microbial resistance and acts as a repellent against pests of different kinds. Salts of boric acid that can be used are for example, borax with different levels of hydratation, such as borax penthahydrate and borax decahydrate. Boric acid or salts thereof may be applied in an amount comprised between 1 and 50 wt %, preferably between 10 and 45 wt %, more preferably between 25 and 40 wt %. It can be added to the recycled material as dry powder but is usually mixed with water and wet sprayed into the recycled material. Other flame retardants, however, may be used instead of or additionally with the boric acid or salt thereof, such as mono- or diammonium sulphate, aluminium sulphate, soda ash, anhydrous silica gel, diammonium phosphate, sodium tetraborate, ferrous sulfate, zinc sulfate, and mixtures thereof, as disclosed, e.g., in U.S. Pat. No. 4,182,681.

The mixture of recycled material and additives (e.g., flame retardant) can then be used as such for spraying dry or with addition of some water to enhance adhesion to non horizontal walls (cf. FIG. 3(a)&(b)) or, alternatively, can be formed into a sheet, batt, or the like by pressing optionally with admixture of a binder and/or sandwiched between two sheets. Other additives or fillers may of course be added as well known by the persons skilled in the art.

Experimental Tests

In order to demonstrate some of the superior properties of insulating material obtained by treating release coated sheet material, the following tests were carried out.

(a) Clogging Test

Material clogging in a hose is a major issue when spraying the insulation material in place. This is particularly sensitive when there is a reduction of the tube diameter, e.g., for allowing access to thinner cavities. In this case, a tube reduction connector is used to connect two hoses of different diameter, as can be found, e.g., in http://www.x-floc.com/en/zubehoer/schlaueche-zub.html. Clogging often occurs at such reduction connectors when the spraying is resumed after an interruption. Clogging is to be avoided, not only because it is time consuming for the operator to stop the spraying, disconnect the hoses and clean them, before connecting them again and resuming the spraying, but also because the filling of a cavity with insulating material to a homogeneous density is better achieved if the spraying of material is continuous, and becomes very difficult to achieve if made in several spraying shots.

In order to assess the flowing properties of the insulating material according to the present invention, two 15 m long hoses were connected with a reduction connector with an inlet diameter of 65 mm and an outlet diameter of 40 mm, corresponding to the diameters of the two hoses. The hose system was then linked to a blowing machine (Zellofant M95 from X-Floc)

The test carried out intends to simulate a spraying situation wherein, at the end of cavity filling, the operator gives a last extra shot of material to prevent settling. At that moment, pressure continues to build up in the hose while there is hardly any material flowing out anymore and material density builds up in the hose. After 20 seconds, the operator finally switches off the machine and inserts the hose into another, empty cavity. At that moment, the flow in the connecting part between the 2 hoses is very critical, and if not sufficiently high, clogging occurs.

Two materials were tested:
INVENTION: silicone coated paper release liners ground according to the invention.
COMPARATIVE: one of the major cellulose brands available on the Belgian market.

Tests were performed 5 times with each material by filling a first cavity of dimensions 1000×500×200 mm, continuing blowing for 20 s after filling of the cavity to build up the pressure within the hose and switching off the pump. After 30 s, the pump was activated again with the hose introduced into a new, empty cavity.

The comparative cellulose material clogged 4 times out of 5 when started again, requiring the manual unclogging of the reduction connector, whilst the silicone coated cellulose material according to the present invention started flowing again immediately in all five repetitions of the test.

(b) Settling Test

The blowing of the cellulose materials into cavities requires quite some expertise, especially with respect to reaching a homogeneous density. The correct method used for blowing in the material is to insert the hose into the cavity and, while blowing and building up layers of insulation material, gradually pull the hose up until the cavity is completely filled. If carried out properly, an insulation mass is obtained which is resistant to settling and maintains its volume over time.

The same insulation materials as described in point (a) supra were used for testing the settling properties according to ISO/CD 18393, method B, wherein insulation material filling a cavity as described in point (a) supra is subjected to impact excitation by dropping it down several times onto an impact bed.

When blowing in the comparative material and the inventive cellulose insulating material at a density of >60 kg/m$^3$ with the correct method used by professionals, no difference in settling behaviour could be observed as both materials showed a high stability with no significant settling.

Differences, however, were observed when the insulating material was blown in from the top with the hose fixed (so no gradual pulling away of the hose) which can occur in typical situations wherein the cavity to be filled is difficult to access or very intricate or, more often, when the insulating work is carried out by an unskilled do-it-yourself person.

Several situations have been simulated where the thus blown comparative cellulose insulation material showed settling of several percents as a 2-6 cm insulating material free fringe appeared at the top of the 1000 mm high cavity. The inventive material treated in the same way, however, did not show any settling at all.

The foregoing observations show that the processability of the inventive cellulose insulation material is superior to the one of the comparative cellulose material, in that it maintains its stability against settling regardless of the way it is blown into a cavity, whilst the comparative material must be blown in very carefully following a rather skillful modus operandi not always possible to achieve, either because of the geometry of the cavity, or because carried out by an amateur DIY operator. It can be said that the skills needed for using the inventive material in order to obtain an optimal end result are lower than the ones needed to process conventional cellulose materials, which means that the former can be applied by unskilled DIY operators, or that it can be applied quicker by professionals.

These two examples illustrate two major advantages of the insulating material according to the present invention over conventional insulating material. The enhanced flowability of the material resulting in substantially less clogging during dispensing of the material is clearly attributable to the presence of the release coating which reduces the frictions between particles during flow. The dimensional stability of the blown material regardless of the blowing method, can also be attributed, at least partly, to the presence of the release coating.

The present invention therefore not only offers an economically and ecologically viable solution to the recycling of release coated liners, which are particularly difficult to recycle, but also provides an alternative insulating material with enhanced properties over the conventional insulating materials available in the market.

The invention claimed is:

1. A method for treating waste material comprising the following steps:
    (a) collecting from producers and end-users thereof, release coated cellulose sheet material or release coated polymeric sheet material comprising a carrier sheet made of cellulose or polymer and a crosslinked release coating applied on at least one face of the carrier sheet,
    (b) preparing the release coated sheet material collected in step (a) by mixing, separating foreign bodies and feeding said material to a dry-grinding station,
    (c) in one or several dry-grinding stations, dry-shredding and dry-grinding the materials fed from step (b) into stripes of an average length comprised between 5 and 30 mm, to form a ground material; and
    (d) optionally adding additives selected from flame retardant, hydrophobic material, pesticide, colorants and mixtures thereof and mixing said additives with the ground material.

2. The method according to claim 1, wherein the release coated cellulose or polymeric sheet material is collected from producers and end-users thereof in the form of dense, bulky stacks, which are pre-shredded into smaller, less dense masses prior to step (b).

3. The method according to claim 1, wherein the dry-shredding and dry-grinding step (c) allows, in the absence of any chemical treatment, the removal of a substantial fraction of the release coating from the sheet carrier and the fraction of the release coating thus removed is separated in a separating station, to form carrier rich fraction and a release agent rich fraction.

4. The method according to claim 1, wherein the waste material collected in step (a), or treated in step (b), or ground in step (c) is blended with cellulose or polymeric sheet waste material of a different type, or with a release agent.

5. The method according to claim 3, wherein the release agent rich fraction is blended with ground cellulose or polymeric sheet waste material of a different type in order to control a content of release agent in the material obtained after step (c).

6. The method according to claim 3, wherein the carrier is made of cellulose and the carrier rich fraction is further processed in a wet shaping station to form sheets of paper.

7. The method according to claim 1, wherein, a flame retardant is added to, and mixed with the material before, during or after the grinding steps (c).

8. The method according to claim 1, wherein the release coated cellulose or polymeric sheets consists of liners for holding self-adhesive labels or films, and the producers and end-users are selected from one or several of: manufacturers of self-adhesive label base material, liner manufacturers, label printers, producers of goods on which are applied self-adhesive labels.

9. The method according to claim 1, wherein the release agent is one of silicone, paraffin, polyurethane, fluorinated or acrylic based material.

10. The method according to claim 1, wherein in step (c), the material is dry-ground into stripes of an average length comprising between 7 and 20 mm.

11. The method according to claim 1, wherein the stripes obtained in step (c) are further comminuted into smaller particles having an average size smaller than 4 mm to form a ground material.

* * * * *